United States Patent
Ludwig et al.

(10) Patent No.: US 7,177,757 B2
(45) Date of Patent: Feb. 13, 2007

(54) METHOD OF CONTROLLING A SWITCHING FLAP, AND A SWITCHING-FLAP ACTUATING UNIT

(75) Inventors: Norbert Ludwig, Brueggen (DE); Frank Buerger, Dueren (DE); Harmut Witte, Neuss (DE)

(73) Assignee: Pierburgh GmbH, Neuss (DE)

( * ) Notice: Subject to any disclaimer, the term of this patent is extended or adjusted under 35 U.S.C. 154(b) by 0 days.

(21) Appl. No.: 11/122,247

(22) Filed: May 5, 2005

(65) Prior Publication Data

US 2005/0263130 A1    Dec. 1, 2005

(30) Foreign Application Priority Data

May 5, 2004    (DE)    ............ 10 2004 022 055

(51) Int. Cl.
*F02B 31/00*    (2006.01)
*F02D 11/10*    (2006.01)
(52) U.S. Cl. ...................... 701/114; 123/399
(58) Field of Classification Search ................ 701/114, 701/110, 115, 102; 123/399, 361, 306
See application file for complete search history.

(56) References Cited

U.S. PATENT DOCUMENTS 5,161,505 A * 11/1992 Bederna et al. ............. 123/399

FOREIGN PATENT DOCUMENTS

DE    196 14 474 A1    10/1997
DE    102 15 927 A1    11/2003

* cited by examiner

*Primary Examiner*—Hieu T. Vo
(74) *Attorney, Agent, or Firm*—Griffin & Szipl, P.C.

(57) ABSTRACT

In a method for controlling a switching flap (10) arranged in an intake pipe connected with an internal-combustion engine the switching flap (10) is rotated with the aid of a switching-flap shaft (12) connected with an electromotor (18). With the aid of a position-detecting device (22,26;24,26) an end position of the switching flap (10) is detected. Subsequently, a rotation force is continued to be applied to the shaft (12) to hold the switching flap (10) in the end position. For detecting a breakage of the switching-flap shaft (12), an error message is generated when the switching-flap shaft (12) continues to rotate beyond the end position.

14 Claims, 1 Drawing Sheet

METHOD OF CONTROLLING A SWITCHING FLAP, AND A SWITCHING-FLAP ACTUATING UNIT

This application claims priority from German Patent Application No. 10 2004 022 055.7, filed May 5, 2004, the entire disclosure of which is incorporated herein by reference.

BACKGROUND OF THE INVENTION

1. Field of the Invention

The invention relates to a method of controlling a switching flap, and a switching-flap actuating unit.

2. Description of Related Art

Switching flaps are arranged in intake pipes which are connected with cylinders of an internal-combustion engine. Such an air intake duct system is, for example, known from DE 196 14 474. The air intake duct system described therein comprises a helical air intake duct for each cylinder. The air is taken in via a central collective inlet duct arranged inside the helical intake ducts. Air is taken in via the collective inlet duct shared by all air intake ducts and routed via the individual air intake ducts to the cylinders of the internal-combustion engine. For changing the length of an air intake duct, a short-circuit duct is provided which is adapted to be opened and closed with a switching flap. In the air intake duct system described in DE 196 14 474 the individual switching flaps are connected with each other via a common shaft. Further, a plurality of switching-flap shafts may be provided, in particular one switching-flap shaft per switching flap. In addition, air intake duct systems are known where the air intake ducts do not extend helically about a collective inlet duct but, in particular in an in-line engine, extend parallel to each other. Here, the shape of the air intake ducts is, for example, adapted to the external circumstances, in particular the space available. For varying the length of the air intake duct, such air intake duct systems comprise switching flaps which are connected with a switching-flap shaft. The common switching-flap shaft or the individual switching-flap shafts is/are connected via a worm gear with a gearwheel segment, i. e. a circular segment of a gearwheel. The gearwheel segment is connected with the switching-flap shaft which supports one switching flap or a plurality of switching flaps. Here, the gearwheel segment serves as a stopper such that two end positions of the switching flap are defined.

Such switching-flap actuating units have the drawback that the gearwheel segment may get stuck in the end positions. Further, damage to the switching-flap shaft or the switching flap itself cannot be detected. In particular, it is not possible to check the operability of the switching flap. In addition, tearing-off of the switching-flap shaft cannot be detected. Thus the safety standard OBD 2 is not complied with.

For detecting a breakage of the switching-flap shaft, it is known from DE 102 15 927 that the shaft is provided, in longitudinal direction, with an electric conductor to which a potential is applied. In the case of shaft breakage, the electric conductor breaks either, such that due to the change in potential the breakage of the shaft can be detected. Here, the electric contact between the conductor and an evaluation means is established by electrically conducting bearing bushes. Consequently, a shaft breakage occurring outside the bearings, or damage to the shaft hub and/or the junction between the switching-flap shaft and a worm gear cannot be detected.

Further, switching-flap actuating units pose the problem that the location of the individual components must be exactly defined for installation purposes. This is in particular difficult when the actuating unit has been removed for the purpose of being subjected to a functional test.

SUMMARY OF THE INVENTION

It is an object of the invention to provide a method of controlling a switching flap, and a switching-flap actuating unit, with the aid of which the operability s of the switching flap can be ensured in a simple manner and/or the installation preparations can be facilitated.

According to the invention, in the method of controlling a switching flap, which is in particular a switching flap arranged in an intake pipe connected with an internal-combustion engine, the switching flap connected with a switching-flap shaft is rotated with the aid of an electromotor. Here, the switching flap is rotated and/or pivoted, for example, from one end position into the other end position, wherein, for instance, a short-circuit duct of the intake pipe is opened in one end position and closed in the other end position. At least one end position, preferably both end positions, is/are detected by a position-detecting means, wherein the position-detecting means preferably comprises two signal transmitters connected with the switching-flap shaft, and one stationary position sensor. In particular, the position sensor is a rotation-angle sensor. The position sensor preferably is a Hall senor, a potentiometer etc. To ensure that the switching flap is reliably held in the end position, a rotation force is applied to the switching-flap shaft in the end position, said rotation force pressing the switching flap against a stopper or the like. This prevents the position of the switching flap from being changed due to air flows, vibrations, or the like.

According to the invention, an error message is generated when it is detected that the switching-flap shaft continues to rotate beyond the end position. When a rotation-angle sensor, such as a potentiometer, is used as a position sensor, it is possible to detect continued rotation on the basis of the rotation-angle position. Preferably, every position detection is effected with the aid of one signal transmitter per end position. The signal transmitters, which preferably are magnets, in particular pin-type magnets, are connected with the switching-flap shaft and communicate with a stationary position sensor, in particular a Hall sensor. When the switching-flap shaft continues to rotate, the signal transmitter, which in the end position concerned normally does not generate a signal at the Hall switch, now generates a signal. This signal is interpreted by a control means as an error message, and/or forwarded to a display means or the like. It is thus possible to detect, in a simple manner, a breakage of the switching-flap shaft.

In particular in combination with the shaft-breakage detection via an electric conductor connected with the switching-flap shaft as described in DE 102 15 927, it is possible to exactly localize a damage of the shaft. If, for example, the means described in DE 102 15 927 indicates that the shaft is in an operable condition, but in the method according to the invention an error message is generated, it can be deduced that the shaft is damaged at the shaft hub and/or outside the shaft bearings.

For performing the control method according to the invention, the gearwheel segment is preferably substituted for by a full gearwheel such that the gearwheel can be rotated by 360°. In the preferred embodiment, wherein two signal transmitters and one position sensor are provided, it may suffice to correspondingly enlarge the gearwheel segment, wherein, after detection of a shaft breakage, the electromotor should be immediately shut off to prevent the gearwheel segment from disengaging from the worm gear. Provision of a full gearwheel further offers the advantage that the gearwheel segment cannot get stuck in an end position.

In the control method according to the invention for the purpose of installation preparation of the switching-flap actuating unit, which is an independent claim, the switching-flap shaft is rotated prior to installation until one of the at least two signal transmitters generates a signal at the position sensor. Here, the signal transmitters preferably are magnets, in particular pin-type magnets, and the position sensor, which is stationary, is a Hall sensor. The signal generated by the signal transmitter is a position-specific signal. This means that the signal is uniquely assigned to a position of the switching flap. Thus, the two signal transmitters provided in the preferred embodiment can generate different signals. This allows the signal transmitters preferably configured as magnets to be installed at different locations such that in one signal transmitter the north pole and in the other signal transmitter the south pole points in the direction of the position sensor. Further, it is possible to provide magnets with different magnetic strengths, and to combine the position and the magnetic strength, in particular when more than two signal transmitters are provided.

If the position-specific signal corresponds to the installation-position signal forwarded by the position sensor to a control or evaluation means, rotation of the switching-flap shaft is stopped since the switching-flap shaft is already in its installation position. If the position-specific signal does not correspond to the installation-position signal, the switching-flap shaft continues to rotate until the next signal transmitter facing the position sensor generates a signal. If this signal is the position-specific installation-position signal, rotation of the switching-flap shaft is stopped, and/or the electromotor is shut off. If more than two signal transmitters are provided, continued rotation of the switching-flap shaft may be necessary.

Preferably, the shaft continues to rotate in that direction in which the path to the installation position is shorter. This is possible since the positions of the signal transmitters relative to each other are known.

A gear, in particular a worm gear, may be arranged between the electromotor and the switching-flap shaft. Consequently, a gearwheel or a gearwheel segment of the gear is to be brought into the installation position prior to connection with the switching-flap shaft, wherein subsequently the switching-flap shaft is connected, in a specified position, to the gearwheel and/or the gearwheel segment. Further, the gearwheel and/or the gearwheel segment may be brought into the installation position by applying the method for installation preparation described above. Here, the signal transmitters are not directly connected with the shaft but with the gearwheel and/or the gearwheel segment.

Rotation of the switching-flap shaft and/or the gear for the purpose of reaching the installation position is preferably effected slowly with the aid of the pulse width modulation. If, for example, the second signal transmitter is to be moved into a position opposite the position sensor after the first signal transmitter has reached this position, and thus a relatively large distance has to be covered, the switching-flap shaft and/or the gear may be rapidly rotated.

For bringing the switching flap of the switching-flap assembly into an installation position for installation purposes, preferably the gearwheel and/or the switching-flap shaft are rotated, in particular at full speed, in a defined rotating direction. When the first signal transmitter has reached the required end position and/or a first Hall signal has been generated, the switching-flap shaft and/or the gearwheel continue to rotate, preferably at low speed, in the same rotating direction. Thus, the switching-flap shaft continues to slowly rotate until another Hall signal is generated. In this position of the switching flap and/or the gearwheel, which the switching flap cannot reach in the installed condition, the motor is shut off. The drive is now in an exactly defined position. This may facilitate the installation of the switching-flap actuating unit.

Further, the invention relates to a switching-flap actuating unit for a switching flap arranged in an intake pipe connected with an internal-combustion engine. The switching-flap actuating unit comprises an electromotor connected with a switching-flap shaft. Further, a position-detecting means comprising a stationary position sensor, in particular a Hall sensor, and at least two signal transmitters, in particular pin-type magnets, connected with the switching-flap shaft is provided. According to the invention, the switching-flap actuating unit comprises signal transmitters which generate position-specific signals.

Further, according to the invention, a single position sensor is provided which detects the different position-specific signals. In the preferred embodiment, the position sensor is a bipolar or programmable Hall switch.

Preferably, a gear, in particular a worm gear, is provided between the electromotor and the switching-flap shaft. Preferably, the worm gear comprises a full gearwheel. It is possible to arrange the signal transmitters directly at the full gearwheel.

The switching-flap actuating unit is preferably configured as described in conjunction with the methods illustrated above.

Thus, in accordance with the present invention, a method embodiment for controlling a switching flap (10) arranged in an intake pipe connected with an internal-combustion engine is provided, wherein the method includes the steps of: (a) rotating, with the aid of an electromotor (18), a switching-flap shaft (12) connected with the switching flap (10); (b) detecting an end position of the switching flap (10) with the aid of a position-detecting means (22,26; 24,26); (c) applying a rotation force to the switching-flap shaft (12) to ensure that the switching flap (10) is held in the end position; and (d) generating an error message upon detection that the switching-flap shaft (12) has continued to rotate beyond the end position.

In accordance with another method embodiment of the present invention, a control method for the purpose of installation preparation for a switching-flap actuating means comprising an electromotor (18) connected with a switching-flap shaft (12), and a position-detecting means (22,26; 24,26) having a stationary position sensor (26) and at least two signal transmitters (22,24) connected with the switching-flap shaft (12), is provided, wherein the method includes the steps of: (a) rotating the switching-flap shaft (12) until one of the signal transmitters (22,24) generates a signal at the position sensor (26), wherein the signal transmitters (22,24) generate a respective position-specific signal; and (b) stopping the rotation of the switching-flap shaft (12) when the position-specific signal corresponds to a predetermined installation position.

In accordance with another embodiment of the present invention, a switching-flap actuating unit for a switching flap (10) arranged in an intake pipe connected with an internal-combustion engine, is provided that includes: (a) a switching-flap shaft (12) connected with an electromotor (18); and (b) a position-detecting means (22,26; 24,26) having a stationary position sensor (26) and at least two signal transmitters (22,24) connected with the switching-flap shaft (12), wherein the signal transmiffers (22,24) generate a position-specific signal and the one position sensor (26) detects different position-specific signals.

BRIEF DESCRIPTION OF THE DRAWINGS

Hereunder a preferred embodiment of the invention is described in detail with reference to the accompanying drawings in which.

DETAILED DESCRIPTION OF THE PREFERRED EMBODIMENT OF THE INVENTION

Figure 1:
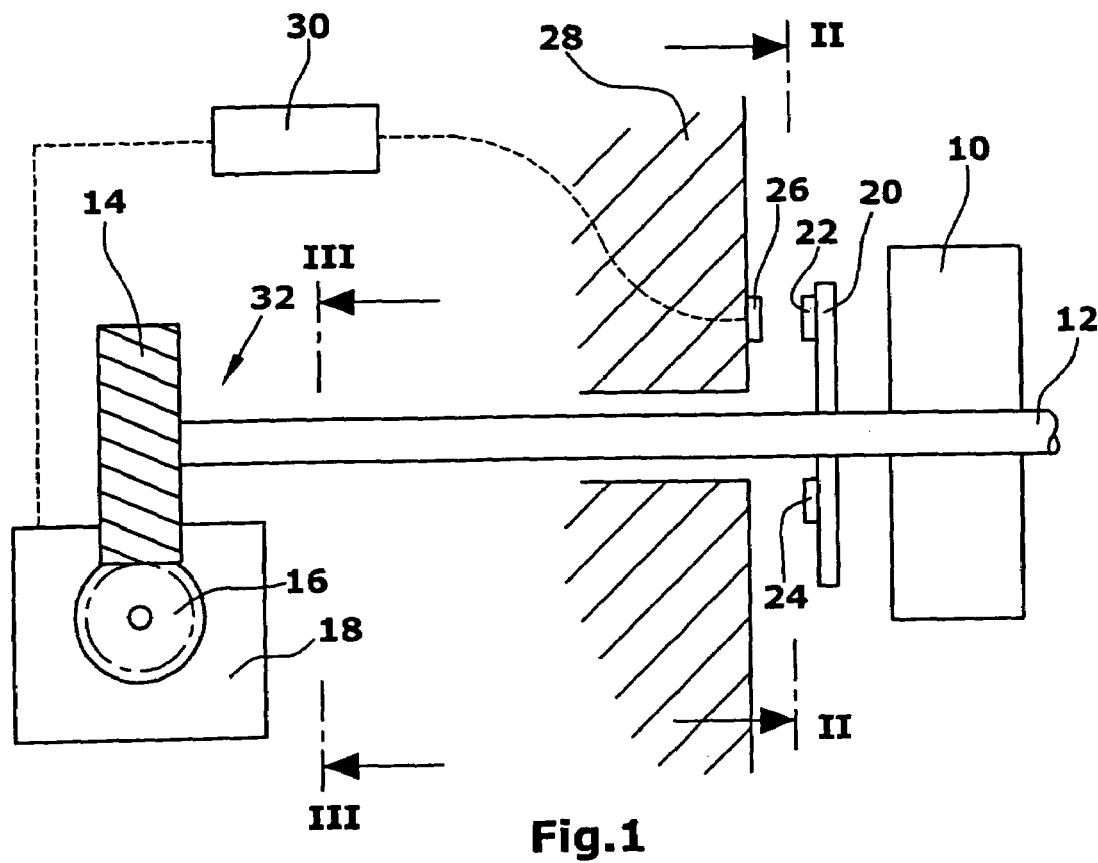
FIG. 1 shows a schematic side view of a switching-flap assembly.
Figure 2:
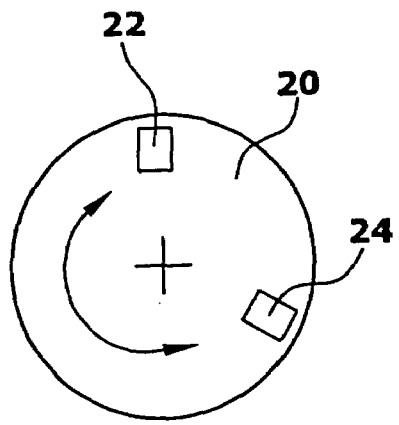
FIG. 2 shows a schematic sectional view taken along line II—II of FIG. 1.
Figure 3:
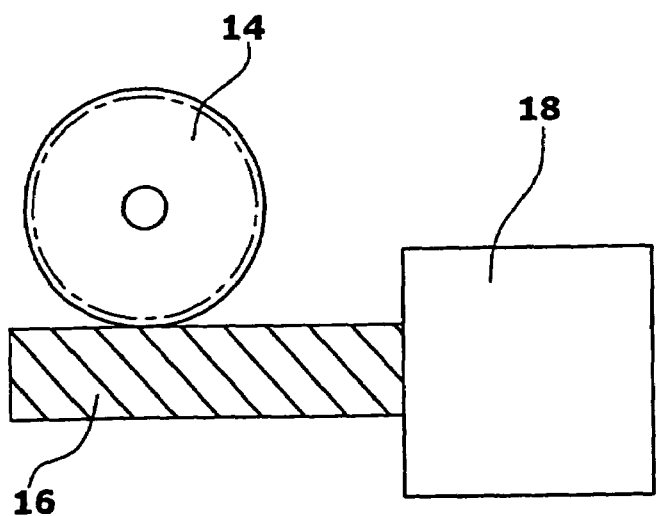
FIG. 3 shows a schematic sectional view taken along line III—III of FIG. 1

A switching flap 10 is connected via a switching-flap shaft 12 with a full gearwheel 14. The gearwheel 14 engages with a worm gear 16 which is driven by an electromotor 18.

Further, the switching-flap shaft 12 has connected thereto a disk 20 and/or a corresponding holding fixture supporting two signal transmitters 22,24. The signal transmitters can also be directly connected to the gearwheel 14 such that an additional holding fixture is not required. The two signal transmitters 22,24 communicate with a position sensor 26 which is stationarily arranged at a housing 28. The position sensor 26 issues a signal when one of the signal transmitters 22,24 is located opposite the position sensor 26. The signal is forwarded to a control/evaluation means 30.

The switching flap 10 is in a position shown in FIG. 1, for example an end position, in which the signal transmitter 22 is arranged opposite the position sensor 26. In this end position the electromotor 18 continues to apply a rotation force to the switching flap 10 such that the switching flap 10 is held in this position. In the end position the switching flap 10 bears, for example, upon a duct inner wall, serving as a stopper, of an intake pipe, wherein a change in the position of the switching flap 10 due to air flows or vibrations must be prevented.

If the switching-flap shaft 12 is broken, it would be possible to continue to rotate the switching-flap shaft 12 even after one of the two end positions has been reached, until the second signal transmitter 24 and/or 22 is arranged opposite the position sensor 26 and another signal is generated. This other signal is detected as an error message by the control means 30. The detected error message can, for example, be forwarded to a display means in the cockpit of a motor vehicle.

In particular in combination with shaft-breakage detection by provision of an electric conductor as described in DE 102 15 927, it is possible to detect a shaft breakage and/or a damage to the shaft at the shaft hub 32 and/or at a junction between the switching-flap shaft 12 and the gearwheel 14.

By applying the control method according to the invention, it is in particular possible to meet the safety standard OBD 2.

For performing the control method according to the invention for the purpose of installation preparation, pin-type magnets are preferably used as signal transmitters 22,24, wherein the pin-type magnets 22,24 are arranged such that in one magnet the north pole and in the other magnet the south pole points in the direction of the position sensor 26.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A switching-flap actuating unit for a switching flap arranged in an intake pipe connected with an internal-combustion engine, comprising:
    a switching-flap shaft connected with an electromotor, and
    a position-detecting means having a stationary position sensor and at least two signal transmitters connected with the switching-flap shaft,
    wherein the signal transmitters generate a position-specific signal and the one position sensor detects different position-specific signals.

2. The switching-flap actuating unit according to claim 1, wherein the position sensor is a bipolar or programmable Hall switch.

3. The switching-flap actuating unit according to claim 1, wherein the signal transmitters are magnets.

4. The switching-flap actuating unit according to claim 3, wherein the magnets are pin-type magnets.

5. The switching-flap actuating unit according to claim 1, wherein between the electromotor and the switching-flap shaft a gear, comprising a full gearwheel connected with the switching-flap shaft, is arranged.

6. The switching-flap actuating unit according to claim 5, wherein the gear is a worm gear.

7. A method for controlling a switching flap arranged in an intake pipe connected with an internal-combustion engine, the method comprising the steps of:
    rotating, with the aid of an electromotor, a switching-flap shaft connected with the switching flap,
    detecting an end position of the switching flap with the aid of a position-detecting means for detecting at least one end position,
    applying a rotation force to the switching-flap shaft to ensure that the switching flap is held in the end position, and
    generating an error message upon detection that the switching-flap shaft has continued to rotate beyond the end position.

8. The control method according to claim 7, wherein continued rotation is detected with the aid of the position-detecting means, wherein the position-detecting mean comprises signal transmitters connected with the switching-flap shaft and a stationary position sensor.

9. The control method according to claim 7, wherein the switching flap is adapted to be rotated into two end positions, and at each end position a signal transmitter connected with the switching-flap shaft is provided.

10. The control method according to claim 7, wherein, upon continued rotation, the signal transmitter, at the end position not desired, generates the error message.

11. A control method for the purpose of installation preparation for a switching-flap actuating means comprising an electromotor connected with a switching-flap shaft, and a position-detecting means having a stationary position sensor and at least two signal transmitters connected with the switching-flap shaft, the method comprising the steps of:

rotating the switching-flap shaft until one of the signal transmitters generates a signal at the position sensor, wherein the signal transmitters generate a respective position-specific signal, and stopping the rotation of the switching-flap shaft when the position-specific signal corresponds to a predetermined installation position.

12. The control method according to claim 11, comprising:

continuing to rotate the switching-flap shaft until the next signal transmitter has reached the required end position if the installation position had not yet been attained.

13. The control method according to claim 12, wherein continued rotation is effected in that direction in which the path to the installation position is shorter.

14. The control method according to claim 11, wherein between the electromotor and the switching-flap shaft a gear is provided, and a gearwheel, gearwheel segment, or a gearwheel and a gearwheel segment, connected with the switching-flap shaft is brought into the installation position.

* * * * *

UNITED STATES PATENT AND TRADEMARK OFFICE
CERTIFICATE OF CORRECTION

PATENT NO.        : 7,177,757 B2
APPLICATION NO.   : 11/122247
DATED             : February 13, 2007
INVENTOR(S)       : Norbert Ludwig et al.

It is certified that error appears in the above-identified patent and that said Letters Patent is hereby corrected as shown below:

On The title page (73)
In the Assignee section:

Please delete "Pierburgh GmbH, Neuss (DE)" and insert therefore --Pierburg GmbH, Neuss (DE)--.

Signed and Sealed this

Fifth Day of June, 2007

JON W. DUDAS
*Director of the United States Patent and Trademark Office*